United States Patent Office 2,779,772
Patented Jan. 29, 1957

2,779,772
GREEN SUBSTANTIVE DYES OF THE ANTHRAQUINONE SERIES

Wolfgang Frey, Neue Welt, near Basel, Switzerland, assignor, by mesne assignments, to Saul & Co., as nominee of Fidelity Union Trust Company No Drawing. Application October 6, 1952, Serial No. 313,350

Claims priority, application Switzerland October 18, 1951

6 Claims. (Cl. 260—368)

The present invention relates to green substantive dyes of the anthraquinone series.

Copending application, Ser. No. 202,418, filed December 22, 1950 (and which has since matured as U. S. Patent No. 2,623,884), discloses green substantive dyestuffs prepared by condensing one mol of a compound of the formula

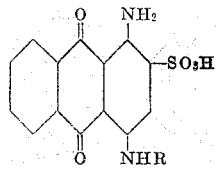

wherein R stands for a phenyl or diphenyl radical containing a free amino group and which may be further substituted, with another mol of a similarly or differently substituted starting compound of the same general formula, through the medium of a maleic or fumaric acid derivative. In case two different starting compounds are employed, they are used in substantially molecular proportions. The thus-obtained dyestuffs are of very good fastness to light. The wet-fastness properties of some of these dyestuffs are capable of improvement. Those dyestuffs characterized by outstanding fastness properties are not always of sufficient solubility for certain applications, particularly for apparatus dyeing.

A primary object of the present invention is the embodiment of a group of dyestuffs which, while possessing the advantages of the aforesaid dyestuffs, are free of the enumerated shortcomings.

This object is realized, according to the present invention, which provides a group of substantive dyestuffs of the anthraquinone series which combine very good light fastness properties with good wet-fastness properties, good solubility and good exhaustion capacity. These improved dyestuffs are obtained, according to the invention, by condensing a 1-aminoanthraquinone-2-sulfonic acid of the formula

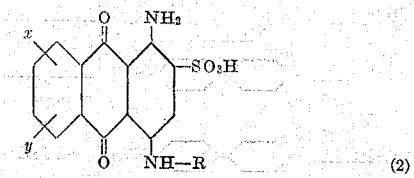

wherein R stands for a phenyl or diphenyl radical which contains a free amino groups and which may be further substituted by alkyl, alkoxy or $SO_3H$, $x$ stands for hydrogen, $SO_3H$ or halogen, and $y$ stands for hydrogen or halogen, in non-molecular proportion with at least one different 1-amino-anthraquinone-2-sulfonic acid of Formula 2 and/or at least one yellow aminoazo dyestuff, through the medium of a dicarboxylic acid halide of the formula

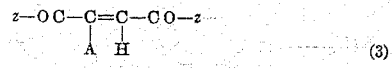

wherein $z$ stands for chlorine or bromine, and A stands for hydrogen, methyl, chlorine or bromine, one mol of dicarboxylic acid halide being present for each two mols of 1-amino-anthraquinone-2-sulfonic acid and/or aminoazo dyestuff.

Suitable starting materials are the 1-amino-anthraquinone-2-sulfonic acids which correspond to the type formula

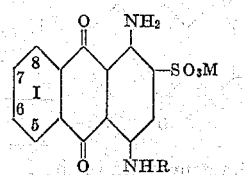

wherein R stands for a phenyl or diphenyl radical which contains a free amino group and which may be substituted by lower alkyl such as methyl, ethyl and the like, by lower alkoxy such as methoxy, ethoxy and the like, or by $SO_3H$, and M stands for H, Li, Na or K, and nucleus I may carry in the positions 5, 6, 7 or 8 a sulfonic acid group or in the positions 6 or 7 a halogen atom, e. g. chlorine or bromine, or in the positions 6 and 7 two chlorine atoms.

The starting compounds of Formula i are obtained by the condensation of a 1-amino-4-halogenanthraquinone-2-sulfonic acid which corresponds to the type formula

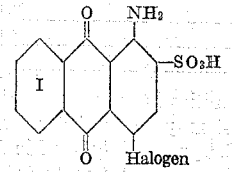

wherein nucleus I may be substituted as hereinbefore set forth, with p-phenylenediamine or benzidine, or with a p-phenylenediamine or a benzidine, wherein the phenyl nuclei are substituted by lower alkyl, lower alkoxy or $SO_3H$, as previously indicated in connection with the definition of R. Starting compounds of Formula i thus comprise, for example, the condensation products of 1-amino-4-bromo-anthraquinone-2-sulfonic acid with 1,4-diamino-benzene, 1,4-diamino-2-methylbenzene, 1,4 - diamino-2-methoxybenzene, 1,4-diaminobenzene-2-sulfonic acid and 4,4'-diaminodiphenyl-3-sulfonic acid; the condensation products of 1-amino-4-bromo-anthraquinone-2,5-, -2,6-, -2,7- and -2,8-disulfonic acid as well as mixtures of these sulfonic acids with p-phenylenediamine, benzidine, 4,4'-diaminodiphenyl-3-sulfonic acid, 4,4'-diamino-3,3'-dimethyldiphenyl and 4,4' - diamino - 3,3' - dimethoxy - diphenyl; the condensation products of 1-amino-4-bromo-6- and -7-chloro-anthraquinone-2-sulfonic acid with 4,4'-diaminodiphenyl-3-sulfonic acid; the condensation product of 1-amino-4-bromo-6,7-dichloro-anthraquinone - 2 - sulfonic acid with 4,4'-diaminodiphenyl-3-sulfonic acid; etc.

Especially interesting is the simplest compound which corresponds to the formula

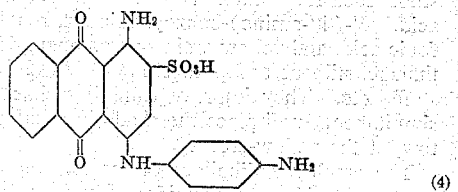

because, for example when condensed with fumaric acid dichloride, it yields a green dyestuff of outstanding fastness to light and good wash-fastness properties, although its solubility in the dyebath is not entirely satisfactory. However, the solubility of the dyestuff can be improved according to the invention so that it can be employed in apparatus dyeing when, in the preparation thereof, other starting compounds of similar structure or yellow aminoazo dyestuffs are added in non-molecular proportions, i. e., in other than equimolecular proportions.

This effect was not foreseeable since it is not realized when, for example, the dyestuffs of the aforesaid copending application are mixed in like proportions. Thus, the condensation of 6 mols of Compound 4, 1 mol of the compound of the formula

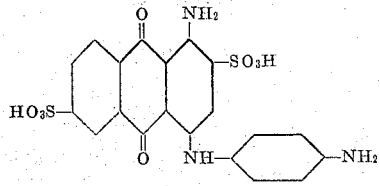

(5)

and 1 mol of the compound of the formula

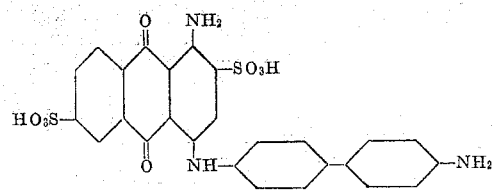

(6)

with 4 mols of fumaric acid dichloride yields a dyestuff capable of use in apparatus dyeing and having good washfastness and good exhaustion capacity, while the mixture of:

2 mols_____(4)—fumaryl—(4)
1 mol_____(4)—fumaryl—(5)
1 mol_____(4)—fumaryl—(6)

gives rise to difficulties in apparatus dyeing. A comparative solubility test may be carried out as follows: 20 cc. of a solution of 0.1 gram of dyestuff in 280 cc. of distilled water, to which 20 cc. of an aqueous sodium sulfate solution of 10% strength have been added, are heated to 60° C. and filtered through a filter paper of 15 cm. diameter, folded into the shape of a cone. In the first case, the solution passes without residue through the filter; in the second case, substantially all the dyestuff remains on the filter as a blackish green deposit, while the filtrate runs through in a pale green color.

The number of components is unlimited. Satisfactory dyestuffs can be prepared as well with 2 components, provided they do not stand in the mol proportion 1:1, as with 3, 4 or more components. The desired improvement of the dyestuffs is obtained, when the portion of the starting materials which are added in small amounts, corresponds to at least 10 percent of the molecules of the mixture. If there are two components, the deviation of the 1:1 proportion has to be at least of about 10 percent. This is not to say that all mixtures yield dyestuffs of equally good solubility and good exhaustion capacity. The examples, hereinafter set forth, illustrate proportions which produce satisfactory results.

As components, in addition to the anthraquinone derivatives, use can also be made of yellow aminoazo dyestuffs, such for example as 4-aminoazobenzene-4'-sulfonic acid, 4'-(4''-amino)-benzoylaminoazobenzene-3',4-disulfonic acid, and yellow aminoazo compounds of the naphthalene, stilbene and pyrazolone series, aminodisazo dyestuffs, etc. They improve solubility characteristics and simultaneously displace the shade in a valuable direction toward the yellow-green.

The employed dihalides of maleic and fumaric acids are the chlorides and bromides of fumaric acid, of chloro- and bromo-fumaric acid and of mesaconic acid, and their stereoisomeric forms. The dicarboxylic acid halides substituted at the —C=C— bridge yield, in comparison with those which are not so substituted, dye shades which are displaced somewhat toward the blue; by suitable selection of the components and, in suitable cases, by the addition of aminoazo dyestuffs to the mixture of starting materials, the formation of undesired bluish dyestuffs can be avoided.

The dyestuffs of the invention are prepared by dissolving the mixture of starting materials in water and adding the calculated amount of acid chloride, if necessary with a slight excess, at substantially normal temperature (about 0–30° C.) and while maintaining a substantially neutral reaction by the addition of acid-binding agents. The formed dyestuffs are isolated by salting out or by precipitating out by the addition of acid, etc. In dry form, they are dark green to greenish black powders which dissolve with bluish green, green to yellowish green coloration in water. From these solutions, the dyes draw onto fibers and articles of natural or regenerated cellulose in corresponding shades, and yield dyeings of outstanding fastness to light and good fastness to washing.

The following examples illustrate the invention without, however, being restrictive thereof. In the examples, the parts, unless otherwise indicated, are parts by weight. The employed intermediates of the anthraquinone series are summarized in the following table; they are identified in the examples by the corresponding Roman numerals.

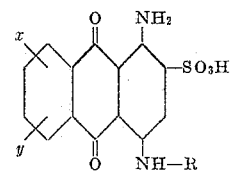

| No. | R | $x$ | $y$ | Position of $x$ | Position of $y$ |
|---|---|---|---|---|---|
| I | —⌬(OCH₃)—NH₂ | | | | |
| II | —⌬—NH₂ | —SO₃H | | 6 | |
| III | —⌬(OCH₃)—⌬(OCH₃)—NH₂ | —SO₃H | | 7 | |
| IV | —⌬(SO₃H)—⌬—NH₂ | —Cl | —Cl | 6 | 7 |
| V | —⌬—⌬—NH₂ | —SO₃H | | 6 | |
| VI | —⌬(SO₃H)—NH₂ | | | | |
| VII | —⌬—NH₂ | | | | |
| VIII | —⌬—⌬(SO₃H)—NH₂ | | | | |
| IX | —⌬(CH₃)—⌬(CH₃)—NH₂ | —SO₃H | | 7 | |
| X | —⌬—⌬—NH₂ | —SO₃H | | 5 | |
| XI | —⌬—⌬—NH₂ | —SO₃H | | 8 | |
| XII | —⌬(SO₃H)—NH₂ | —Cl | | 7 | |
| XIII | —⌬(SO₃H)—NH₂ | —Br | | 6 | |

In the following examples, temperatures are set forth in degrees centigrade. Percentages are by weight. The relationship between part by weight and part by volume is the same as that between the gram and the cubic centimeter.

*Example 1*

4.7 parts of Compound VII, 1.65 parts of Compound V, 1.7 parts of Compound IX and 1.65 parts of Compound VIII are dissolved in 400 parts of water with addition of 1.2 parts of lithium carbonate. At 0–3° and while stirring thoroughly, 10.5 parts by volume of a molar solution of fumaryl chloride in carbon tetrachloride are added. By the slow dropwise addition of 10 parts by volume of an aqueous sodium hydroxide solution of 10% strength, the reaction is maintained at a pH of 4.5 to 6.5. Upon completion of the condensation, the carbon tetrachloride is distilled off, the reaction mixture adjusted to alkalinity with aqueous sodium hydroxide solution, and the formed dyestuff filtered off at 20°. It is washed with aqueous sodium chloride solution and dried.

The dyestuff is a dark-green powder which dissolves with green coloration in water, and dyes cotton and regenerated cellulose in green shades of very good light fastness and wet-fastness.

A similar dyestuff is obtained when, while otherwise proceeding as aforedescribed in this example, the fumaryl dichloride is replaced by an equivalent quantity of maleinyl dichloride or of fumaryl dibromide.

*Example 2*

5 parts by volume of an aqueous sodium hydroxide solution of 10% strength, 4.1 parts (1.0 molecular proportion) of Compound VII, 2.2 parts (0.5 molecular proportion) of Compound I, 1.25 parts (0.25 molecular proportion) of Compound II and 1.45 parts (0.25 molecular proportion) of Compound V are stirred into 400 parts of water. When dissolution is complete, the solution is cooled to approximately 0°, and 10.5 parts by volume of a molar solution of fumaryl dichloride in carbon tetrachloride are added. The reaction mixture is kept weakly acid with dilute aqueous sodium hydroxide solution. Upon completion of the condensation, the carbon tetrachloride is distilled off, the reaction mass adjusted to strong alkalinity with aqueous sodium hydroxide solution, and the formed dyestuff then filtered off at 20°. The filtrate is washed with an aqueous sodium sulfate solution of 7% strength and then dried.

The dyestuff dissolves with green coloration in water and dyes cotton and regenerated cellulose a fast green.

If while proceeding as aforedescribed in the present example, the fumaryl dichloride is replaced by an equivalent mixture of fumaryl dichloride and mesaconyl dichloride—the latter for example in an amount of 0.5 part—then a bluish green dyestuff of similar properties is obtained.

*Example 3*

5.9 parts (1.4 molecular proportions) of Compound VII, i. e. of the compound of the formula

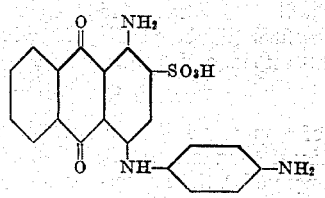

and 1.4 parts (0.3 molecular proportion) of Compound VI, i. e. of the compound of the formula

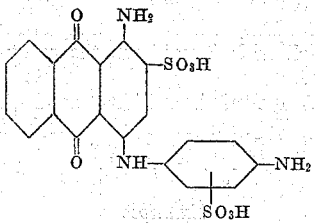

and 0.85 part, i. e. 0.3 molecular proportion, of 4′-amino-1,1′-azobenzene-4-sulfonic acid

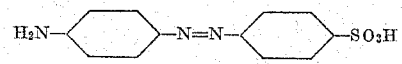

are dissolved in 400 parts of water, with addition of 0.7 part of lithium carbonate. At 0–5°, 10.5 parts by volume of a molar fumaryl dichloride solution in carbon tetrachloride and 8 parts by volume of an aqueous sodium hydroxide solution of 10% strength are simultaneously added dropwise in such manner that the pH of the reaction mixture remains between 4.5 and 6. Upon completion of the condensation, the reaction mixture is acidified, the separated dyestuff is suction-filtered off, the weakly acid filter cake triturated with the amount of sodium carbonate necessary for neutralization and then dried.

The thus-obtained dyestuff dyes cotton and regenerated cellulose, from aqueous solution, in a pretty green shade of good fastness properties.

By omitting the 0.85 part (0.3 molecular proportion) of 4′-amino-1,1′-azobenzene-4-sulfonic acid and using in its stead 1.4 parts (0.3 molecular proportion) of Compound VI, i. e. of the compound of formula

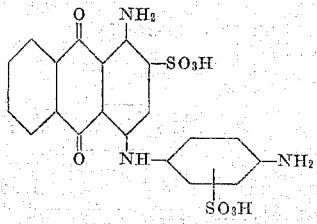

there is obtained a somewhat more bluish dyestuff of good solubility in the dyebath, which draws well onto cotton and fibers of regenerated cellulose and the dyeings of which are of excellent fastness to light and wet-fastness.

*Example 4*

1.45 parts (0.22 molecular proportion) of Compound IV, 2.2 parts (0.45 molecular proportion) of Compound II and 5.45 parts (1.33 molecular proportion) of Compound VII are dissolved in 350 parts of water, with the aid of 0.6 part of lithium carbonate. At 3°, 1.6 parts of fumaryl dichloride are added and, while agitating thoroughly, the temperature is allowed to rise to 20°. During this period, the mixture is maintained neutral by the addition of about 9 parts by volume of aqueous sodium hydroxide solution of 10% strength. The resultant dyestuff is worked up as in the preceding examples; it is a dark powder which dissolves with green coloration in water and dyes cotton and regenerated cellulose in the same color.

By replacing the 1.6 parts of fumaryl dichloride by 1.7 parts of mesaconyl dichloride and otherwise proceeding as aforedescribed in the present example, a strongly bluish green dyestuff is obtained.

*Example 5*

3.8 parts of Compound V, 4.2 parts of Compound III and 1.9 parts of 4′-amino-1,1′-azobenzene-4-sulfonic acid are dissolved in 400 parts of an aqueous solution of lithium carbonate of 0.15% strength. The reaction mixture is cooled to 10–15°, and 1.1 parts by volume of fumaryl dichloride are added. The reaction mixture is maintained weakly acid by the dropwise addition of an aqueous sodium hydroxide solution of 10% strength. When the dichloride is used up, the reaction mixture is made alkaline, 40 parts of sodium sulfate are added, and the separated dyestuff is suction-filtered off in the cold. After drying, a green powder is obtained which dyes cotton and regenerated cellulose, from aqueous solution, in yellowish green shades of good fastness properties.

*Example 6*

1.45 parts (0.25 molecular proportion) of Compound V, i. e. of the compound of the formula

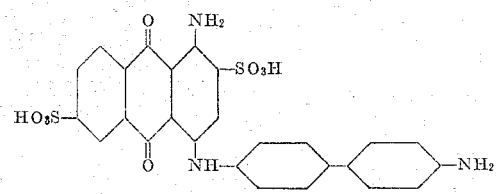

and 1.25 parts (0.25 molecular proportion) of Compound II, i. e. of the compound of the formula

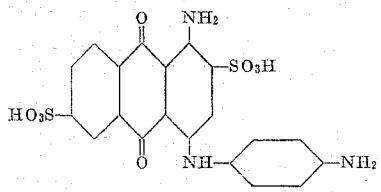

and 6.15 parts (1.5 molecular proportions) of Compound VII, i. e. of the compound of the formula

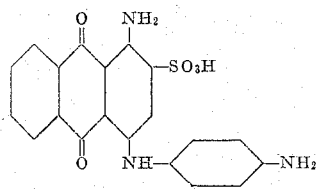

and 1 part of lithium carbonate are dissolved in 350 parts of water. At 5°, 1.6 parts of fumaryl dichloride are added, and the reaction mixture agitated thoroughly while being maintained quite weakly acid by means of dilute aqueous sodium hydroxide solution. Upon completion of the condensation, the reaction mixture is adjusted to strong alkalinity with the aid of aqueous sodium hydroxide solution of 29% strength, and the formed dyestuff suction-filtered off and washed with aqueous sodium chloride solution.

The thus-obtained dyestuff is easily soluble in the dyebath and dyes cotton and regenerated cellulose in green shades with good exhaustion. The dyeings are outstandingly light-fast and wet-fast.

A similar dyestuff is obtained when, while otherwise proceeding as described in the present example, the 1.45 parts of Compound V are replaced by 1.45 parts of a technical mixture of Compounds X and XI.

*Example 7*

1.5 parts of Compound V, 5.2 parts of Compound VII and 2.4 parts of an aqueous paste (of 38% strength) of technical 4'-amino-2,3'-dimethyl-1,1'-azobenzene-4-sulfonic acid are dissolved, together with 0.6 part of lithium carbonate, in 300 parts of water. At 0–5°, 2 parts of chlorofumaryl dichloride are added, and the pH of the reaction mixture is maintained between 4 and 6 with the aid of dilute aqueous sodium hydroxide solution. Upon completion of the condensation, the reaction mixture is adjusted to alkalinity, 20 parts of sodium chloride are added, and the formed dyestuff is suction-filtered off. It dissolves in water with bluish-green coloration and dyes cotton and regenerated cellulose in bluish-green shades of excellent properties.

*Example 8*

5.9 parts (1.45 molecular proportions) of Compound VII and 2.8 parts (0.55 molecular proportion) of Compound II are dissolved, together with 0.7 part of lithium carbonate, in 300 parts of water, and the reaction mixture cooled to 0–5°. Then, within a period of ½ hour and while stirring, 10.5 parts by volume of a molar solution of fumaryl dichloride in carbon tetrachloride are added, the reaction mixture being maintained weakly acid by the addition of aqueous caustic soda solution of 10% strength. Upon completion of the reaction, the carbon tetrachloride is distilled off. After strong acidification, the formed dyestuff acid is suction-filtered off hot; by pasting with sodium carbonate it is rendered neutral, after which it is dried.

The dyestuff thus obtained is a dark green powder which draws well from aqueous solution onto cotton and regenerated cellulose, and remains dissolved in the dyebath even after the addition of salt. Its dyeings, which are green, are outstandingly light-fast and wet-fast.

*Example 9*

Into 350 parts of water, there are stirred 0.6 part of lithium carbonate, 5.45 parts of Compound VII, 1.1 parts of Compound II and 1.9 parts of 4-(4''-aminobenzoyl)-amino-1,1'-azobenzene - 3,4' - disulfonic acid. When dissolution is complete, 5.8 parts by volume of a two-molar solution of fumaryl dichloride in trichlorethylene are added at 0–10°, and the reaction mixture maintained at pH 5–6 with approximately 7 parts of aqueous sodium hydroxide solution of 10% strength. The trichlorethylene is subsequently distilled off, the dyestuff precipitated out with acid and then filtered off at 50°. The dyestuff acid thus obtained is pasted with the requisite quantity of sodium carbonate for neutralization, and is then dried.

The dyestuff dyes cotton and regenerated cellulose from aqueous solution in beautiful green shades of very good fastness properties.

*Example 10*

5 parts by volume of aqueous sodium hydroxide solution of 10% strength, 1.9 parts of Compound V, 1.9 parts of Compound VIII, 4.1 parts of Compound VII and 2 parts of Compound IX are dissolved in 400 parts of water and, at 10° and a pH of 4–6, 1.9 parts of chlorofumaryl dichloride are added. The initial pH value is maintained by means of dilute aqueous sodium hydroxide solution. Upon completion of the resultant condensation, the dyestuff is worked up as in the preceding examples. It dyes cotton and regenerated cellulose from aqueous solution in bluish green shades.

*Example 11*

Into 300 parts of water, there are stirred 0.7 part of lithium carbonate, 5.45 parts of Compound VII, 2.2 parts of Compound VI and 1.3 parts of Compound V. At 0–5°, 1.6 parts of fumaryl dichloride are added, and the reaction mixture maintained quite weakly acid with the aid of dilute aqueous sodium hydroxide solution. Upon completion of the resultant condensation, the formed green dyestuff is precipitated with hydrochloric acid and then converted into the sodium salt in conventional manner. It is readily soluble in the dyebath, draws very well onto cotton and regenerated cellulose and dyes the fibers in beautiful green shades of outstanding light-fastness and wet-fastness.

*Example 12*

1.9 parts of Compound VI, 1.9 parts of 4-(4''-aminobenzoyl)-amino-1,1'-azobenzene-3,4'-disulfonic acid, 4.5 parts of Compound VII, 0.6 part of 4'-amino-1,1'-azobenzene-4-sulfonic acid and 5 parts by volume of aqueous sodium hydroxide solution of 10% strength are dissolved in 350 parts of water. At a pH of 4–6, 10.5 parts by volume of a molar solution of fumaryl dichloride in carbon tetrachloride are added, and the pH maintained at its original value by means of dilute aqueous sodium hydroxide solution. Upon completion of the ensuing reaction, the mixture is warmed to distil off the carbon tetrachloride, after which the dyestuff is salted out and isolated. It dissolves with green coloration in water, and dyes cotton and regenerated cellulose in green shades of good fastness properties.

*Example 13*

Into 300 parts of water, there are stirred 0.6 part of lithium carbonate, 2.1 parts of Compound VII, 2.9 parts of Compound V, 3.15 parts of Compound III and 1.4 parts of 4'-amino-1,1'-azobenzene-4-sulfonic acid. After the reaction mixture has been cooled to 0–5° and adjusted to a weakly acid reaction, 1.6 parts of fumaryl dichloride are added. Evolved HCl is neutralized with dilute aqueous sodium hydroxide solution. Upon completion of the condensation, aqueous sodium hydroxide solution of 30% strength is added until the reaction mixture has a strong alkaline reaction, 20 parts of sodium sulfate are added, and the separated dyestuff suction-filtered off. It dissolves readily in water and in the dyebath with yellowish green coloration, and dyes cotton and regenerated cellulose yellowish green. The exchaustion capacity is excellent, and the dyeings are of very good light fastness and wet-fastness.

*Example 14*

In 350 parts of water, 0.9 part of lithium carbonate, 6.2 parts of Compound VII, 1.45 parts of Compound V and 1.5 parts of Compound III are dissolved. At 0–5° and a pH of 5–7, 1.6 parts of fumaryl dichloride are added

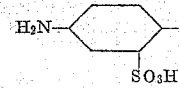

and the pH maintained constant with dilute aqueous sodium hydroxide solution. Upon completion of the ensuing reaction, 3.5 parts of sodium chloride and 20 parts by volume of aqueous sodium hydroxide solution of 29% strength are added, and the precipitated green dyestuff is filtered off. From an aqueous solution, this dyestuff dyes cotton and regenerated cellulose in green shades of good fastness properties.

*Example 15*

Into 500 parts of water, there are stirred 5 parts (1.2 molecular proportions) of Compound VII, i. e. of the compound of the formula

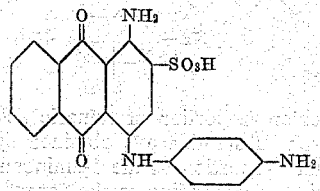

and 3.4 parts (0.8 molecular proportion) of the aminoazo dyestuff of the formula

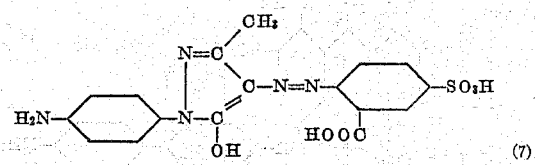

and 5.5 parts of aqueous sodium hydroxide solution of 10% strength. At 0–5°, 1.6 parts of fumaryl dichloride are then added dropwise, the reaction being maintained weakly alkaline (pH 7–8.5) with the aid of dilute aqueous sodium hydroxide solution. Upon completion of the resultant condensation, the reaction mixture is heated to 80° and 6 parts of crystalline sodium acetate and 14.5 parts of aqueous copper sulfate solution of 20% strength are added. The mixture is maintained for 15 more minutes at 80°, with stirring, and then the formed cupriferous dyestuff is precipitated from the solution with 36 parts of sodium chloride, and then suction-filtered off and dried.

The cupriferous dyestuff draws from aqueous solution onto cotton and regenerated cellulose in beautiful green shades of outstanding light-fastness and wet-fastness.

*Example 16*

3.4 parts of Compound VII and 5.1 parts of the aminoazo dyestuff of Formula 7 are dissolved in 500 parts of water and 5.5 parts of aqueous sodium hydroxide solution of 10% strength. At 0–5°, 1.6 parts of fumaryl dichloride are added dropwise, the pH of the reaction mixture being maintained at 7–8 with the aid of dilute aqueous sodium hydroxide solution. Upon completion of the ensuing condensation, the reaction mixture is heated to 80°, and the dyestuff acid thrown down with hydrochloric acid and then suction-filtered off.

The moist dyestuff is neutralized with sodium carbonate; to the resultant paste, 6 parts of crystalline sodium acetate and 24 parts of aqueous copper sulfate solution of 20% strength are added. After drying, there is obtained a cupriferous dyestuff which dyes cotton and regenerated cellulose from aqueous solution in yellowish green shades with outstanding fastness properties.

*Example 17*

5.9 parts of Compound VII and 5.9 parts of the cupriferous aminoazo dyestuff of the formula

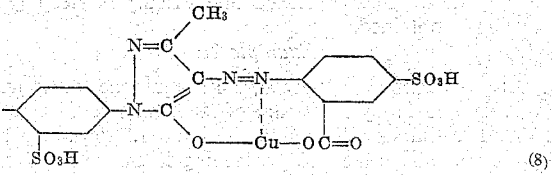

are dissolved in 500 parts of water and 5.5 parts of aqueous sodium hydroxide solution of 10% strength. At a pH of 7.5–8.5 and at a temperature of 0.5°, there are then added dropwise in the course of an hour 11 parts by volume of a molar solution of fumaryl dichloride in carbon tetrachloride. Correction of the acidity of the mixture is effected with the aid of a dilute aqueous sodium hydroxide solution. Upon completion of the condensation, the carbon tetrachloride is distilled off, the dyestuff is salted out at 80° with 80 parts of potassium chloride, after which the dyestuff is suction-filtered off cold and dried.

The dyestuff dissolves readily in water and draws from the dyebath onto cotton and regenerated cellulose in beautiful green shades with very good light-fasteness and wet-fastness properties.

*Example 18*

9.8 parts (1.2 molecular proportions) of Compound VII, i. e. of the compound of the formula

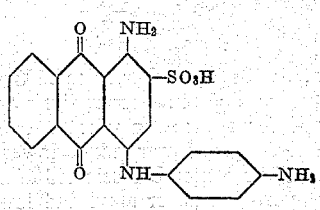

and 4.6 parts (0.8 molecular proportion) of the compound of the formula

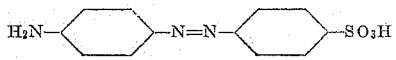

(4'-amino-1,1'-azobenzene-4-sulfonic acid) are dissolved in 600 parts of water and 5 parts of aqueous sodium hydroxide solution of 10% strength. At 0–5° and at pH 7–8.5, 3.5 parts of fumaryl dichloride are added dropwise in the course of a half hour. Correction of the acidity is effected with dilute aqueous sodium hydroxide solution. When the fumaryl dichloride has been entirely consumed, the solution is warmed to 80°, and the dyestuff acid precipitated with 60 parts of 30% hydrochloric acid and filtered off. The dyestuff acid is then neutralized with sodium carbonate and dried.

The thus-obtained dyestuff is a dark green powder which dyes cotton and regenerated cellulose from aqueous solution in green shades. The dyeings are characterized by very good light-fastness and wet-fastness.

Similar dyestuffs, which are in part slightly more blue, are obtained when, in Examples 11–18, the fumaryl dichloride is replaced by an equivalent amount of fumaryl dibromide, chlorofumaryl dichloride, chlorofumaryl dibromide, bromofumaryl dichloride, bromofumaryl dibromide, mesaconyl dichloride or citraconyl dichloride.

*Example 19*

1 part of the dyestuff prepared according to Example 3, first paragraph, is ground together with ½ part of sodium metaphosphate and ½ part of urea and then dissolved in 200 parts of boiling water. The solution is poured into 3000 parts of water, 40 parts of anhydrous sodium sulfate are added, and at 30° 100 parts of pre-wetted cotton material introduced. The solution is warmed to 80° and maintained at 80–90° for 30 minutes, thereupon boiled for 15 minutes and then cooled to 60°. The material is then rinsed and dried. A deep green dyeing is obtained.

*Example 20*

By replacing the starting anthraquinone compounds of Example 11 by a mixture of 5.45 parts of Compound VII, 2.35 parts of Compound XII and 1.3 parts of Compound V, and otherwise proceeding in the same manner as described in such example, a similar green dyestuff is obtained.

*Example 21*

The process according to Example 11 is repeated except that the 2.2 parts of Compound VI are replaced by 2.6 parts of Compound XIII. A dyestuff dyeing cotton and fibers made from regenerated cellulose in beautiful green shades of very good fastness to light and to wet treatments is obtained.

Having thus disclosed the invention, what is claimed is:

1. A green substantive dye obtained by condensing, in molecular proportions which differ from each other by at least 10%, a 1-aminoanthraquinone-2-sulfonic acid corresponding to the formula

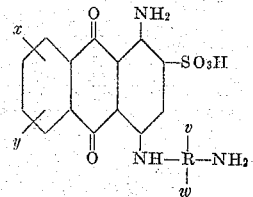

wherein R stands for a member selected from the group consisting of mono- and binuclear radicals of the benzene series, $v$ stands for a member selected from the group consisting of hydrogen, lower alkyl, lower alkoxy and $SO_3H$, $w$ stands for a member selected from the group consisting of hydrogen, lower alkyl and lower alkoxy, $x$ stands for a member selected from the group consisting of hydrogen, chlorine, bromine and $SO_3H$, and $y$ stands for a member selected from the group consisting of hydrogen and chlorine, with at least one 1-aminoanthraquinone-2-sulfonic acid different from the first one but corresponding to the aforesaid formula, by treating them with such a quantity of a dicarboxylic acid halide corresponding to the formula

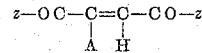

wherein $z$ stands for a member selected from the group consisting of chlorine and bromine, and A stands for a member selected from the group consisting of hydrogen, methyl, chlorine and bromine, that there are for each molecule of the dicarboxylic acid halide two molecules of 1-aminoanthraquinone-2-sulfonic acid.

2. The green substantive dye obtained by condensing 1.45 molecular proportions of the 1-aminoanthraquinone-2-sulfonic acid corresponding to the formula

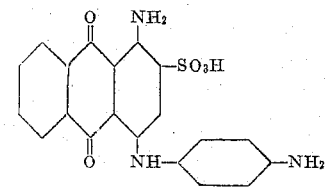

and 0.55 molecular proportion of the 1-aminoanthraquinone-2-sulfonic acid corresponding to the formula

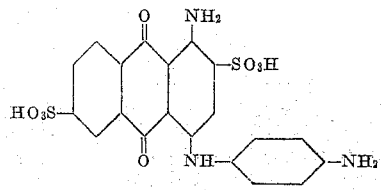

with 1 molecular proportion of fumaric acid dichloride.

3. The green substantive dye obtained by condensing 1.4 molecular proportions of the 1-aminoanthraquinone-2-sulfonic acid corresponding to the formula

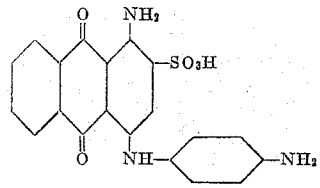

and 0.6 molecular proportion of the 1-aminoanthraquinone-2-sulfonic acid corresponding to the formula

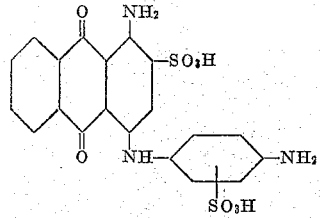

with 1 molecular proportion of fumaric acid dichloride.

4. The green substantive dye obtained by condensing 0.25 molecular proportion of the 1-aminoanthraquinone-2-sulfonic acid corresponding to the formula

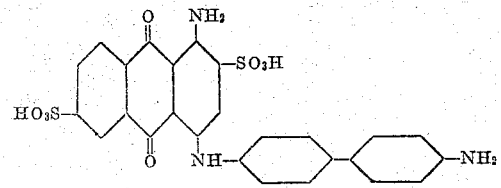

0.25 molecular proportion of the 1-aminoanthraquinone-2-sulfonic acid corresponding to the formula

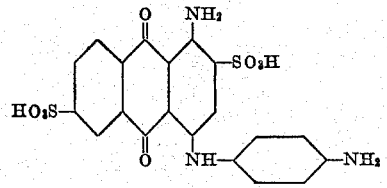

and 1.5 molecular proportions of the 1-aminoanthraquinone-2-sulfonic acid corresponding to the formula

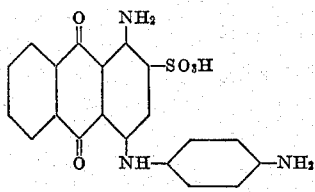

with 1 molecular proportion of fumaric acid dichloride.

5. The green substantive dye obtained by condensing 1.0 molecular proportion of the 1-aminoanthraquinone-2-sulfonic acid corresponding to the formula

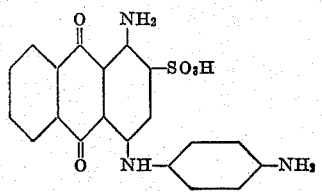

0.5 molecular proportion of the 1-aminoanthraquinone-2-sulfonic acid corresponding to the formula

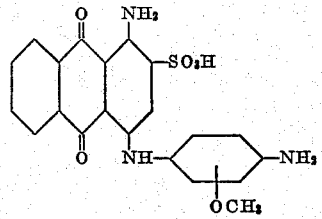

0.25 molecular proportion of the 1-aminoanthraquinone-2-sulfonic acid corresponding to the formula

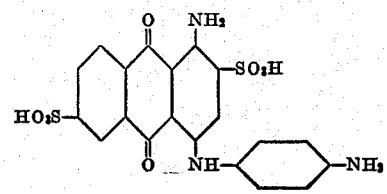

and 0.25 molecular proportion of the 1-aminoanthraquinone-2-sulfonic acid corresponding to the formula

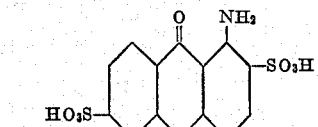

with 1 molecular proportion of fumaric acid dichloride.

6. The green substantive dye obtained by condensing 0.22 molecular proportion of the 1-aminoanthraquinone-2-sulfonic acid corresponding to the formula

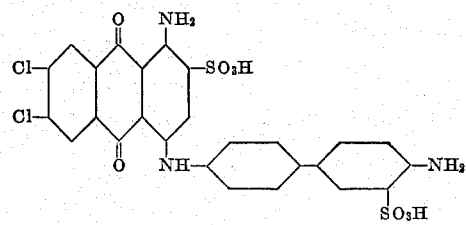

0.45 molecular proportion of the 1-aminoanthraquinone-2-sulfonic acid corresponding to the formula

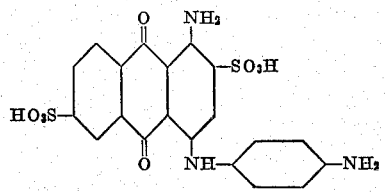

and 1.33 molecular proportions of the 1-aminoanthraquinone-2-sulfonic acid corresponding to the formula

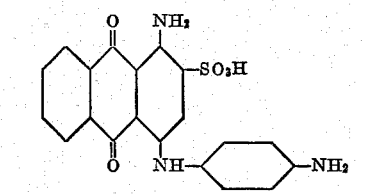

with 1 molecular proportion of fumaric acid chloride.

References Cited in the file of this patent
UNITED STATES PATENTS

| | | |
|---|---|---|
| 2,228,455 | Honold et al. | Jan. 14, 1941 |
| 2,623,884 | Peter et al. | Dec. 30, 1952 |